United States Patent
Yamashita et al.

(10) Patent No.: US 10,632,940 B2
(45) Date of Patent: Apr. 28, 2020

(54) CORRUGATED TUBE RETAINER

(71) Applicant: Yazaki Corporation, Tokyo (JP)

(72) Inventors: Hiroshi Yamashita, Makinohara (JP); Tsukasa Sekino, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/202,615

(22) Filed: Nov. 28, 2018

(65) Prior Publication Data

US 2019/0176724 A1 Jun. 13, 2019

(30) Foreign Application Priority Data

Dec. 7, 2017 (JP) .................. 2017-235202

(51) Int. Cl.
  *H02G 3/04* (2006.01)
  *B60R 16/02* (2006.01)
  *H02G 3/00* (2006.01)
  *B60J 5/06* (2006.01)

(52) U.S. Cl.
  CPC ......... *B60R 16/0215* (2013.01); *H02G 3/263* (2013.01); *B60J 5/06* (2013.01); *H02G 3/0468* (2013.01)

(58) Field of Classification Search
  CPC ........ H02G 3/00; H02G 3/263; H02G 3/0468; B60R 16/0215; B60J 5/06
  USPC ............. 248/49, 65, 73, 74.4; 138/108, 112; 174/92, 68.3, 99 R
  See application file for complete search history.

(56) References Cited

U.S. PATENT DOCUMENTS

| 4,176,245 | A | * | 11/1979 | Merlack | H02G 15/18 174/92 |
| 4,797,513 | A | * | 1/1989 | Ono | H02G 3/088 16/2.2 |
| 5,834,694 | A | * | 11/1998 | Bakker | B60R 16/0207 174/652 |
| 6,627,817 | B1 | * | 9/2003 | Kortenbach | H02G 3/083 174/541 |
| 6,830,225 | B2 | * | 12/2004 | Kato | H02G 3/0487 248/49 |

(Continued)

FOREIGN PATENT DOCUMENTS

| JP | 2003-348743 A | 12/2003 |
| JP | 2007-118849 A | 5/2007 |
| JP | 2016-86543 A | 5/2016 |

*Primary Examiner* — Nkeisha Smith
(74) *Attorney, Agent, or Firm* — Sughrue Mion, PLLC

(57) ABSTRACT

A corrugated tube retainer includes a turning member and a holding member. The turning member has a spherical section into which a corrugated tube is inserted, and a tubular section extending from an outer surface of the spherical section in a tubular shape. The holding member has a first housing section housing the spherical section turnably in a three dimensional direction, and a second housing section in which the corrugated tube is routed. The second housing section is provided with a standing section standing up from a bottom surface of the second housing section, and positioned just below the tubular section. By abutting on the tubular section, the standing section 66 prevents the corrugated tube from touching on a bottom surface of the second housing section.

4 Claims, 4 Drawing Sheets

(56) References Cited

U.S. PATENT DOCUMENTS

| | | | |
|---|---|---|---|
| 7,534,965 B1* | 5/2009 | Thompson | H02G 3/22 |
| | | | 16/2.1 |
| 7,804,027 B2 | 9/2010 | Murayama et al. | |
| 9,102,282 B2* | 8/2015 | Takata | B60R 16/0215 |
| 10,012,330 B1* | 7/2018 | Thomas | B60R 16/0222 |
| 2003/0222183 A1 | 12/2003 | Kato | |
| 2015/0107876 A1* | 4/2015 | Terada | H02G 11/00 |
| | | | 174/135 |

* cited by examiner

CORRUGATED TUBE RETAINER

TECHNICAL FIELD

The present invention relates to a corrugated tube retainer for holding swingably a corrugated tube used to protect the electric wire.

BACKGROUND ART

Conventionally, in a vehicle equipped with a sliding door, a wiring harness is routed from a vehicle body to the sliding door for supplying electric power and transmitting signals from the vehicle body to electric components in the sliding door. Generally, the wiring harness is equipped with an electric wire and a corrugated tube for protecting the electric wire. Further, the wiring harness is held by a retainer installed in the vehicle body, and by a retainer installed in the sliding door.

When the wiring harness is fixed rigidly to the vehicle body and the sliding door with the retainers, the wiring harness is damaged by a large curvature thereof near the retainers when the wiring harness is curved in association with opening and closing of the sliding door. Therefore, various retainers for holding swingably the wiring harness are proposed.

For example, Patent Literature 1 discloses a harness fixture (1) including: a spherical turning member (6) attached to an outer periphery of a corrugated tube (8); and a fixture body (3) fixed to a vehicle body and holding the turning member (6) turnably in a three dimensional direction. By holding the wiring harness (5) swingably with this harness fixture (1), a curvature of the wiring harness (5) in association with opening and closing of a sliding door can be gentler.

CITATION LIST

Patent Literature

Patent Literature 1: JP 2003-348743 A

SUMMARY OF INVENTION

Technical Problem

However, in the harness fixture (1) of Patent Literature 1 described above, there is a concern that the corrugated tube (8) may wear by friction between the corrugated tube (8) and the fixture body (3) when the wiring harness (5) is swung.

Accordingly, an object of the present disclosure is to provide a corrugate tube retainer able to hold a corrugated tube swingably, and able to prevent wear of the corrugated tube.

Solution to Problem

For solving the problems above, according to the present disclosure, there is provided a corrugated tube retainer including:

a turning member attached to one end of the corrugated tube; and a holding member for holding the turning member, wherein the turning member has a spherical section formed in a spherical shape and provided with a through hole into which the corrugated tube is to be inserted, and a tubular section continued from an end of the through hole and extending from an outer surface of the spherical section in a tubular shape, wherein the holding member has a first housing section for housing the spherical section turnably in a three dimensional direction, and a second housing section adjacent to the first housing section at the other end of the corrugated tube side and in which the corrugated tube is routed, wherein the second housing section is provided with a standing section standing up from a bottom surface of the second housing section, and positioned just below the tubular section, and wherein by abutting on the tubular section, the standing section prevents the corrugated tube from touching on the bottom surface of the second housing section.

Effect of the Invention

According to the present disclosure, the corrugated tube retainer includes the standing section and the tubular section, and by abutting on the tubular section, the standing section prevents the corrugated tube from touching on a bottom surface of the second housing section. Therefore, the corrugate tube retainer able to hold a corrugated tube swingably, and able to prevent wear of the corrugated tube can be provided.

DESCRIPTION OF EMBODIMENT

"A corrugated tube retainer" according to an embodiment of the present disclosure will be described with reference to FIGS. 1 to 4.

Figure 1:
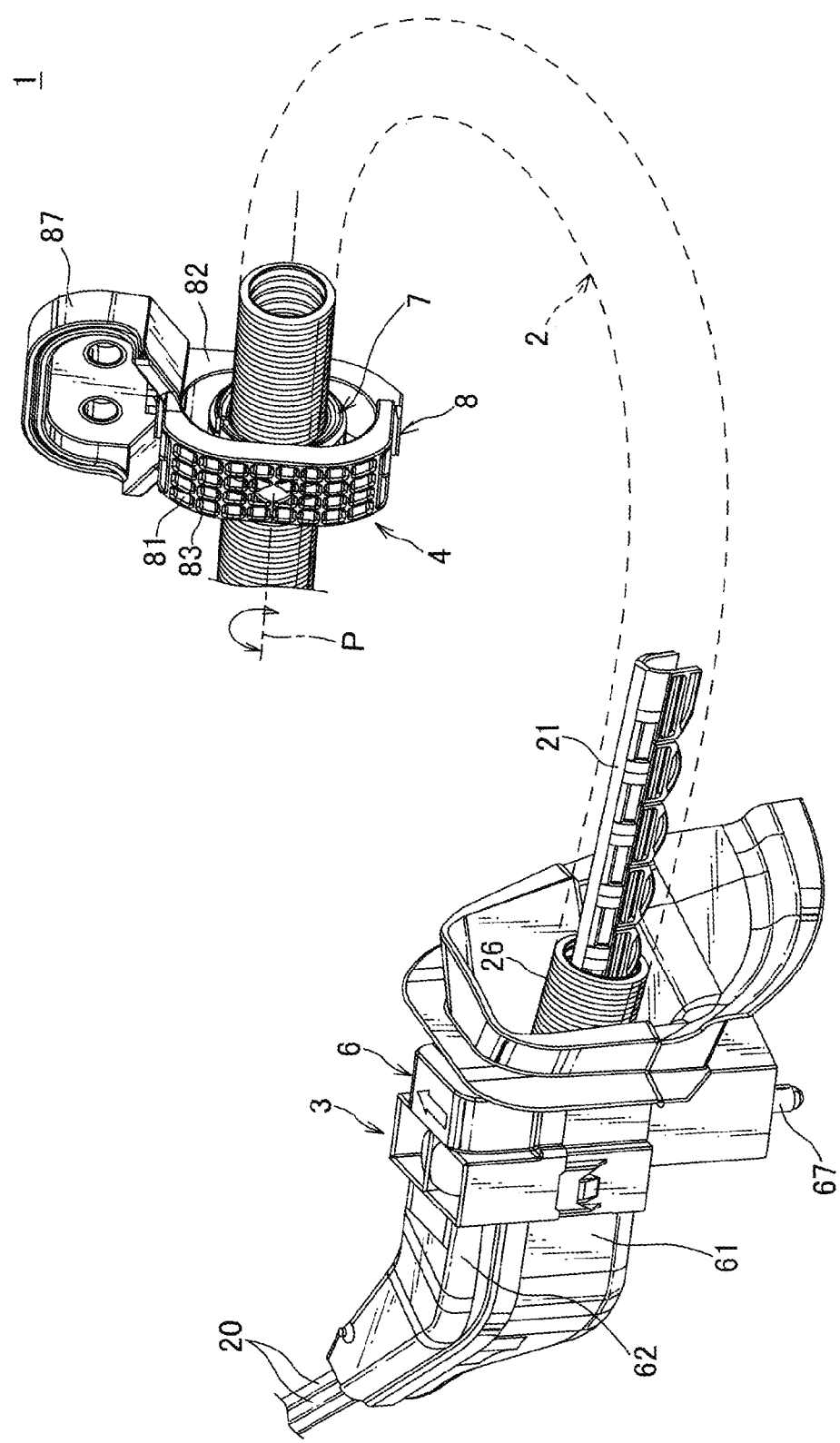
FIG. 1 is a perspective view showing a power supply equipped with a corrugated tube retainer according to an embodiment of the present disclosure.

A power supply 1 shown in FIG. 1 is mounted on a vehicle to supply electric power and transmit signals from a vehicle body to electric components in a sliding door. This power supply 1 includes: a wiring harness 2 routed from the vehicle body to the sliding door; a vehicle-body-side retainer 3 as "the corrugated tube retainer" installed on the vehicle body; and a sliding-door-side retainer 4 installed on the sliding door. The vehicle-body-side retainer 3 and the sliding-door-side retainer 4 hold the wiring harness 2 swingably and immovably in a longitudinal direction.

The wiring harness 2 includes: a plurality of electric wires 20; a curvature regulating member 21; and a corrugated tube 26 covering the electric wires 20 and the curvature regulating member 21. When the sliding door slides in a front and rear direction of the vehicle, the wiring harness 2 is curved properly and is swung at the vehicle-body-side retainer 3 and the sliding-door-side retainer 4.

One ends of the electric wires 20 are connected to a battery and an alternator mounted on the vehicle, and the other ends of the electric wires 20 are connected to the electric components (such as a speaker and a power window) provided on the sliding door. The electric wires 20 are formed longer than the corrugated tube 26 and both ends thereof are drawn from the corrugated tube 26 and exposed. Incidentally, in FIG. 1, the electric wires 20 extending between the vehicle-body-side retainer 3 and the sliding-door-side retainer 4 are not shown.

The corrugated tube 26 is formed in a thin cylindrical shape with synthetic resin, and convexes 27 and concave grooves 28 in a circumferential direction are provided alternately in a longitudinal direction of the corrugated tube 26.

The vehicle-body-side retainer 3 includes: a turning member 5 attached to one end (vehicle body side) of the corrugated tube 26; and a holding member 6 for holding the turning member 5.

Figure 2:
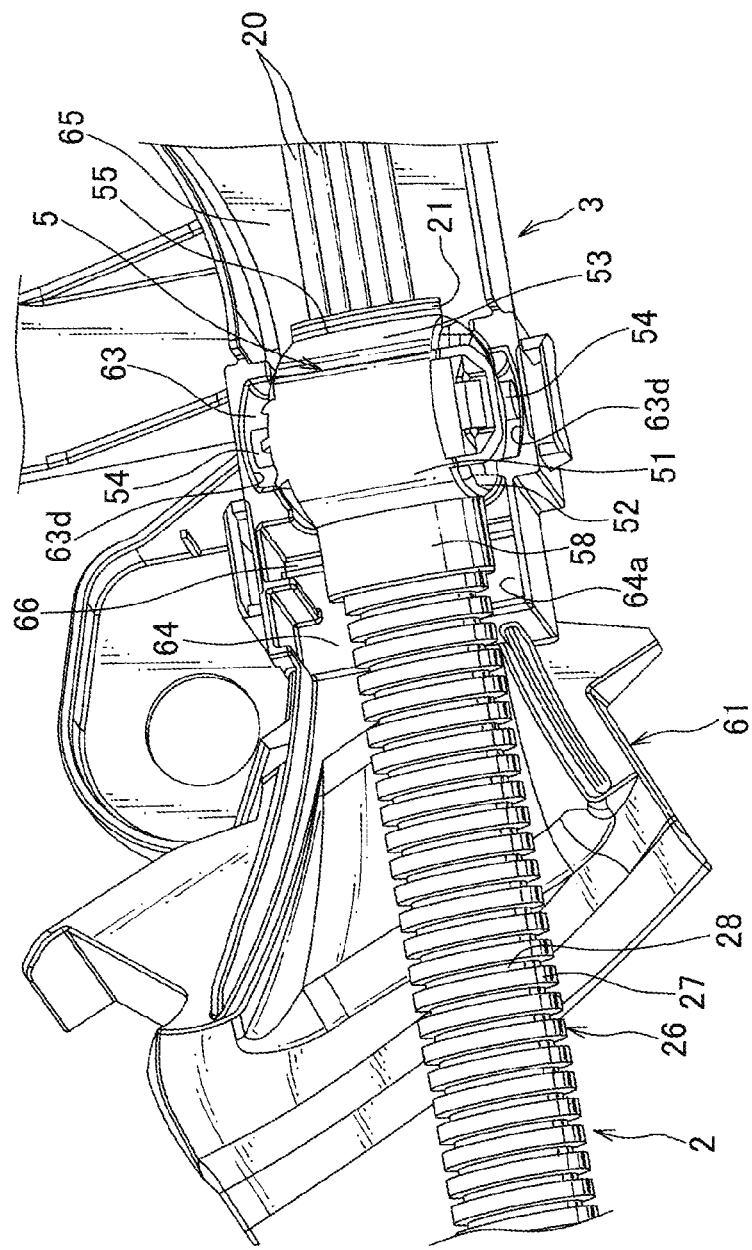
FIG. 2 is a plan view showing a state that a cover is removed from the corrugated tube retainer of FIG. 1.

The turning member 5 is made of synthetic resin. As shown in FIG. 2, the turning member 5 has a spherically formed spherical section 53, a tubular section 58, and a pair of projections 54.

The spherical section 53 is provided with a through hole 55 into which the corrugated tube 26 is inserted. In this embodiment, one end of the corrugated tube 26 is positioned within the through hole 55. A claw 55 engaged with the concave groove 28 of the corrugated tube 26 is formed on an inner surface of the through hole 55. Owing to this claw, the corrugated tube 26 is held immovably in a longitudinal direction.

The tubular section 58 is continued from an end (sliding door side) of the through hole 55 and extends from an outer surface of the spherical section 53 in a cylinder shape. The tubular section 58 is positioned on an outer periphery of the corrugated tube 26. The electric wires 20 drawn from the corrugated tube 26 and exposed are extracted from the other end of the through hole 55.

The pair of projections 54 protrudes from an outer surface of the spherical section 53. This pair of projections 54 is provided symmetrically to a central axis of the through-hole 55 as a symmetry axis. These projections 54 and a later-described concave 63d are aimed for limiting a turning range (turning angle) of the turning member 5.

Further, the turning member 5 of this embodiment is made of vertically two divided upper member 51 and lower member 52. By positioning the corrugated tube 26 in between the upper member 51 and the lower member 52, and by assembling them, the turning member 5 is attached to the corrugated tube 26.

The holding member 6 is made of synthetic resin. The holding member 6 has a first housing section 63, a second housing section 64, a third housing section 65, a positioning boss 67 to be inserted into a positioning hole of the vehicle body, and a fixing section to be bolted to the vehicle body. Further, the holding member 6 of this embodiment is formed tubular as a whole, and made of vertically two divided gutter-shaped base 61 and gutter-shaped cover 62.

Figure 3:
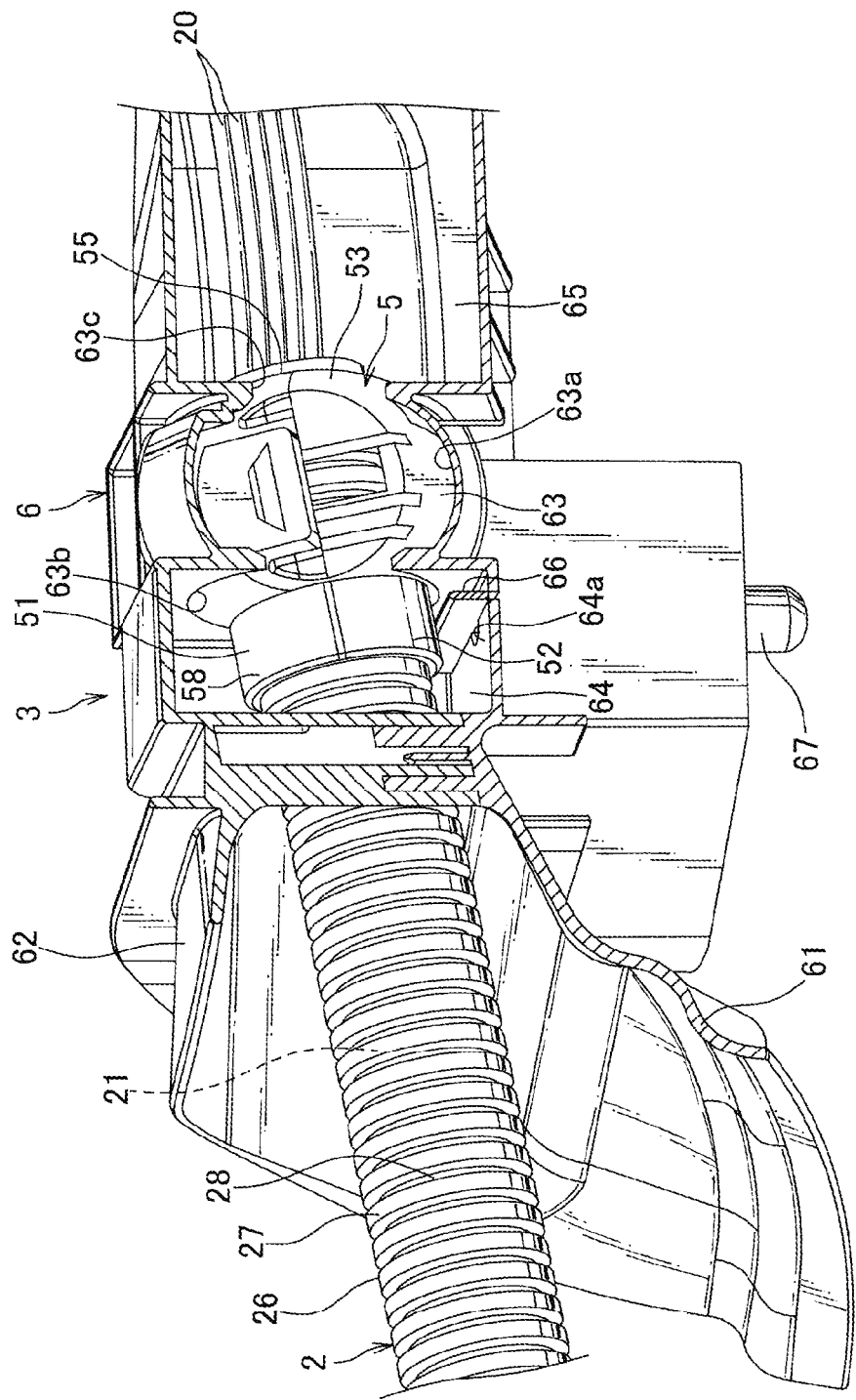
FIG. 3 is a sectional view showing the corrugated tube retainer of FIG. 1.
Figure 4:
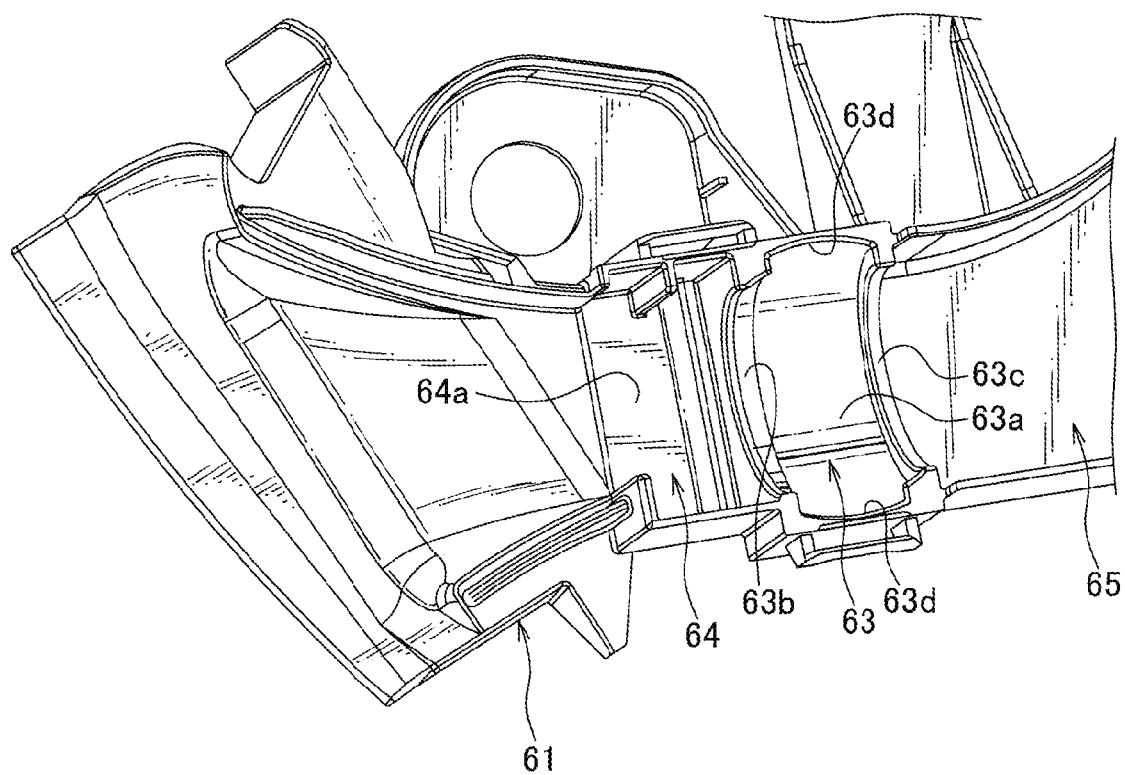
FIG. 4 is a perspective view showing a base constituting the corrugated tube retainer of FIG. 1.

The first housing section 63 houses the spherical section 53 turnably in a three dimensional direction. As shown in FIGS. 3 and 4, an inner surface 63a of the first housing section 63 is a curved surface along an outer surface of the spherical section 53. Namely, the first housing section 63 has a housing space of the same shape as the spherical section 53. A pair of concaves 63d is provided on the inner surface 63a of the first housing section 63 for respectively housing the pair of projections 54 of the turning member 5. Further, the first housing section 63 is provided with a through hole 63b for extracting the wiring harness 2 toward the second housing section 64, and a through hole 63c for extracting the electric wires 20 toward the third housing section 65.

The wiring harness 64 extracted from the tubular section 58 is routed within the second housing section 64. The second housing section 64 is adjacent to the first housing section 63 at one side (the other side of the corrugated tube 26, namely, the sliding door side). The second housing section 64 is formed in a tubular shape opening toward an opposite side of the first housing section 63. Further, the second housing section 64 is formed in a trumpet shape gradually expanding as extending away from the first housing section 63.

As shown in FIG. 3, the second housing section 64 is provided with a standing section 66 standing up from a bottom surface 64a of the second housing section 64, and positioned just below the tubular section 58. Further, the standing section 66 of this embodiment is a rib extending in a direction intersecting with a longitudinal direction of the corrugated tube 26. By abutting on the tubular section 58, the standing section 66 prevents the corrugated tube 26 from touching on a bottom surface 64a of the second housing section 64. Thereby, when the wiring harness 2 is curved or swung, the corrugated tube 26 is hard to contact the bottom surface 64a, and the wear of the corrugated tube 26 is prevented.

Further, in this embodiment, the standing section 66 and the tubular section 58 are made of different materials. Namely, the base 61 having the standing section 66 and the lower member 52 having a rear half of the tubular section 58 are made of different materials. In this embodiment, the base 61 is made of polypropylene, and the lower member 52 is made of high self-lubricating polyacetal. When the wiring harness 2 is curved or swung, friction is generated between the standing section 66 and the tubular section 58. However, because they are made of different materials (polypropylene, polyacetal), a generation of a stick-slip noise can be prevented.

The third housing section 65 is a portion where the electric wires 20 drawn out from the other end of the through-hole 55 is routed. The third housing section 65 is adjacent to the other side of the first housing section 63. The third housing section 65 is formed in a tubular shape opening toward an opposite side of the first housing section 63.

The sliding-door-side retainer 4 includes: a turning member 7 attached to the other side of the corrugated tube 26; and a holding member 8 holding the turning member 7.

The turning member 7 is made of synthetic resin. The turning member 7 is provided with a through hole into which the wiring harness 2 is inserted, a claw provided on an inner surface of the through hole and engaged with the concave groove 28 of the corrugated tube 26, and a pair of projections as a turning center of the turning member 7. The claw prevents the corrugated tube 26 from moving in a longitudinal direction thereof.

The holding member 8 is made of synthetic resin. The holding member 8 has a surrounding section 83 surrounding the turning member 7, and a fixing section 87 bolted to the sliding door. A pair of concave sections is provided on an inner surface of the surrounding section 83 for respectively housing the pair of projections of the turning member 7. This pair of concave sections is arranged on a dashed straight line P shown in FIG. 1. The chain straight line P is a straight line coincident with a width direction of the vehicle body. Further, the holding member 8 of this embodiment consists of a first member 81 and a second member 82 bisected in a width direction of the vehicle body.

In such a sliding-door-side retainer 4, the turning member 7 is turnable about the dashed straight line P shown in FIG. 1.

In the power supply 1 configured as described above, by holding the wiring harness 2 swingably with the vehiclebody-side retainer 3 and the sliding-door-side retainer 4, a curvature of the wiring harness 2 in association with opening and closing of the sliding door can be gentler. Thereby, it is possible to improve operability of the wiring harness 2, and it is possible to improve durability of the electric wires 20 and the corrugated tube 26.

In the embodiment described above, a case that the vehicle-body-side retainer 3 as "the corrugated tube retainer" is mounted on the vehicle body is explained. However, the corrugated tube retainer of the present disclosure is not limited to be mounted on the vehicle body, but can be mounted on various structures.

Further, the embodiment described above indicates only a typical embodiment of the present disclosure. The present disclosure is not limited to this embodiment. Namely, various modifications can be carried out without departing from a scope of the present disclosure. As long as still includes the configuration of the present disclosure by such modifications, of course, it is intended to be included within the scope of the present disclosure.

REFERENCE SIGNS LIST

1 power supply
2 wiring harness
3 vehicle-body-side retainer (corrugated tube retainer)
4 door-side retainer
5 turning member
6 holding member
26 corrugated tube
53 spherical section
58 tubular section
63 first housing section
64 second housing section
64a bottom surface
66 standing section

The invention claimed is:

1. A corrugated tube retainer comprising:
a turning member attached to one end of a corrugated tube; and
a holding member for holding the turning member,
wherein the turning member has a spherical section formed in a spherical shape and provided with a through hole into which the corrugated tube is to be inserted, and a tubular section continued from an end of the through hole and extending from an outer surface of the spherical section in a tubular shape,
wherein the holding member has a first housing section for housing the spherical section turnably in a three dimensional direction, and a second housing section adjacent to the first housing section in which the corrugated tube is routed,
wherein the second housing section is provided with a standing section standing up from a bottom surface of the second housing section, and positioned just below the tubular section such that there is a gap separating the standing section from the first housing section, and
wherein by abutting on the tubular section, the standing section prevents the corrugated tube from touching on the bottom surface of the second housing section.

2. The corrugated tube retainer as claimed in claim 1, wherein the standing section is a rib extending in a direction intersecting with a longitudinal direction of the corrugated tube.

3. The corrugated tube retainer as claimed in claim 1, wherein the standing section and the tubular section are made of different materials.

4. The corrugated tube retainer as claimed in claim 2, wherein the standing section and the tubular section are made of different materials.

* * * * *